United States Patent
Schneider

(10) Patent No.: US 8,175,268 B2
(45) Date of Patent: *May 8, 2012

(54) GENERATING AND SECURING ARCHIVE KEYS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1005 days.

This patent is subject to a terminal disclaimer.

(21) Appl. No.: 12/125,838

(22) Filed: May 22, 2008

(65) Prior Publication Data

US 2009/0290708 A1 Nov. 26, 2009

(51) Int. Cl.
*H04L 9/00* (2006.01)

(52) U.S. Cl. .......................... 380/44; 713/193

(58) Field of Classification Search .................... 380/44, 380/46, 277, 286; 713/168, 193; 726/4, 726/26–28

See application file for complete search history.

(56) References Cited

U.S. PATENT DOCUMENTS

| | | |
|---|---|---|
| 5,046,036 A | 9/1991 | Tezuka |
| 6,023,506 A | 2/2000 | Ote et al. |
| 6,986,043 B2 | 1/2006 | Andrew et al. |
| 7,010,689 B1 | 3/2006 | Matyas et al. |
| 7,020,282 B1 | 3/2006 | Chang |
| 7,143,288 B2 | 11/2006 | Pham et al. |
| 7,181,016 B2 | 2/2007 | Cross et al. |
| 7,194,091 B2 * | 3/2007 | Higashi et al. ............. 380/202 |
| 7,672,460 B2 * | 3/2010 | Furukawa et al. ........... 380/281 |
| 7,810,133 B2 | 10/2010 | Carter et al. |
| 2006/0048228 A1 * | 3/2006 | Takemori et al. ............. 726/22 |
| 2006/0179309 A1 | 8/2006 | Cross et al. |
| 2007/0118731 A1 | 5/2007 | Zizzi |
| 2007/0214369 A1 | 9/2007 | Roberts et al. |

OTHER PUBLICATIONS

Office Action mailed Jan. 31, 2011 for U.S. Appl. No. 12/125,826.

* cited by examiner

*Primary Examiner* — Gilberto Barron, Jr.
*Assistant Examiner* — Abdulhakim Nobahar
(74) *Attorney, Agent, or Firm* — Lowenstein Sandler PC

(57) ABSTRACT

Described herein is a method and apparatus for managing archives. The archive management process receives a passphrase and an indicator of an archive to be managed. The passphrase is used to encipher or decipher an archive key dependent on whether data is to be inserted or extracted from the archive key. The passphrase can be changed by re-enciphering the archive key.

13 Claims, 5 Drawing Sheets

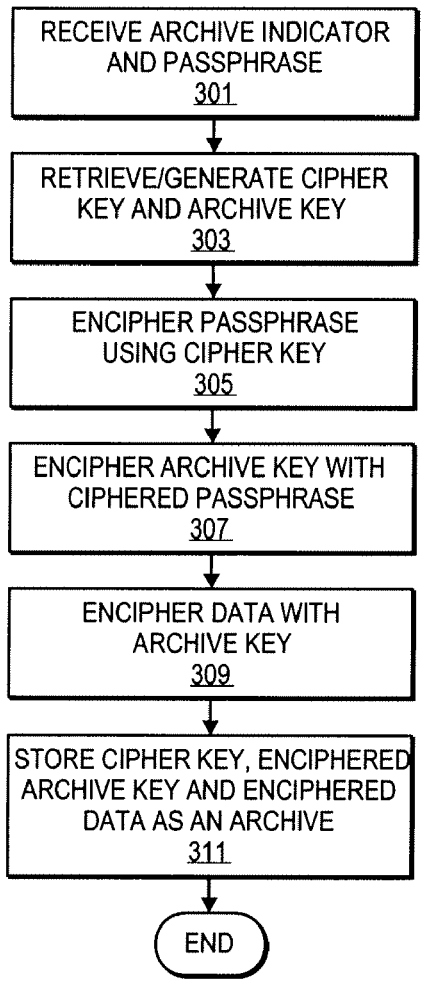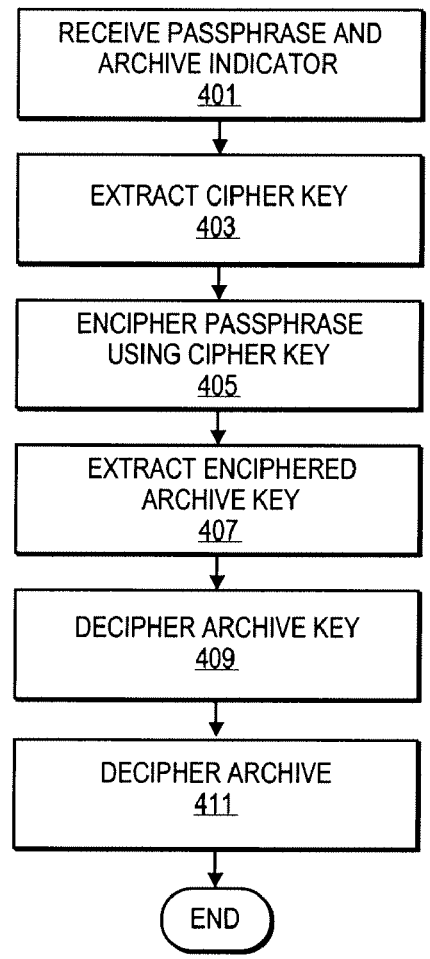
FIG. 3
FIG. 4

GENERATING AND SECURING ARCHIVE KEYS

CROSS-REFERENCE TO RELATED APPLICATIONS

Cross-reference is made to a co-pending application Ser. No. 12/125,826 by James P. Schneider for "Generating and Securing Multiple Archive Keys" filed on the same date as the present application and commonly owned.

TECHNICAL FIELD

Embodiments of the present invention relate to secure archive storage. Specifically, the embodiments of the present invention relate to a method and system for generating a key for enciphering an archive based on a passphrase that enables a change of the passphrase without re-enciphering the archive.

BACKGROUND

Archives are file systems and documents that are stored in persistent storage systems. Persistent storage systems include fixed optical or magnetic drives, flash memory devices, and removable storage devices such as read-write compact discs (RW-CDs) drives and magnetic tape drives. These archives are enciphered to secure the contents of the drive by limiting access to the contents of the archive to a user supplying a correct password.

The enciphering process that creates or adds to an archive requests a password from a user. The password is then input into a hashing algorithm to produce a key. The key is utilized to encipher the entire archive using a block cipher algorithm. However, this system presents several security and logistical problems. If the same password is used for multiple archives, then the same key is generated for each archive. Determining a key that is utilized to encipher data is made easier when a larger set of enciphered data is available. Thus, using the same key for multiple archives is not desirable, because it creates a large data set that is more vulnerable to unauthorized access.

Another problem with the use of this method and system is that the change of a password requires that the entire archive be re-enciphered using a new key generated from the new password. Archives can be large and re-enciphering these archives can be time consuming and inconvenient. All archives enciphered with a changed key must be deciphered and then re-enciphered with a new key. Also, archives can be distributed over multiple volumes, which can be on seperate devices or discs. As a result, the changing of the password can be very time and resource consuming especially for large archives or archives with multiple volumes.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 3 is a flowchart of one embodiment of a process for enciphering an archive or data to be stored in an archive.

FIG. 4 is a diagram of one embodiment of a process for deciphering an archive.

DETAILED DESCRIPTION

Described herein is a method and apparatus for managing archives. The archive management process receives a passphrase and an indicator of an archive to be managed. The passphrase is used to encipher or decipher an archive key dependent on whether data is to be inserted or extracted from the archive key. The passphrase can be changed by re-enciphering the archive key based on a new passphrase.

Figure 1:
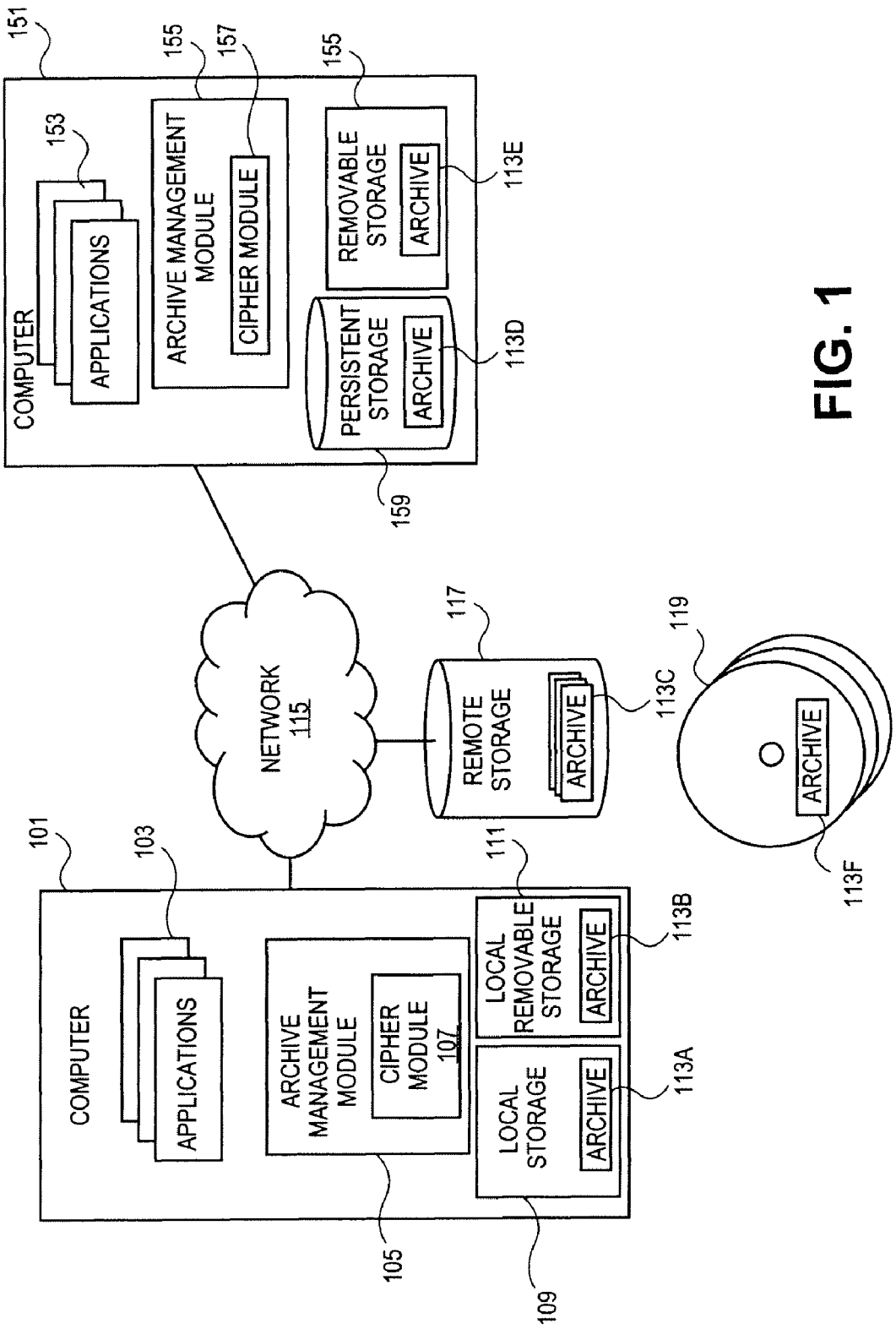
FIG. 1 is a diagram of one embodiment of a system for archive management.

FIG. 1 is a diagram of one embodiment of a system for archive management. The system for archive management includes at least one computer 101 having an archive management module 105 and at least one local storage device 109, 111. The system may also include additional computers 151, remote storage units 117, and network connections 115.

The computer 101 can be any type of computing device including a desktop computer, laptop computer, server, handheld device, console device, wireless device or similar computing device. The computer can execute any number of applications 103. These applications can be any type of applications including word processing applications, web browsing applications and similar applications. The applications 103 can generate date to be stored in local or remote storage devices.

The computer 101 can also include any number of local storage devices. Local storage devices may be fixed 109 or removable storage devices 111. Local fixed storage devices 109 can include a hard drive (magnetic storage device), flash memory device, optical storage device or similar fixed storage device. Removable storage devices 111 can include a read/write compact disc players, digital versatile disc (DVD) players, high definition (HD) disc players such as a BLU-RAY or HD DVD read/write drives and magnetic storage drive such as a tape or ZIP disk storage drives or similar storage devices that store data in associated media 119.

The computer 101 includes an archive management module 105. The archive management module 105 is a program or component of the computer 101 that enables applications 103, operating system components and similar programs on the computer 101 to access and store data in archives in the local storage devices 109, 111. The applications 103 or other programs can directly call the archive management module 105 or a user can interact with the archive management module to archive data files stored in the storage devices, 109, 111.

In one embodiment, the archive management module 105 includes a cipher module 107. The cipher module 107 enciphers data to be stored in an archive or deciphers data stored in an archive. An archive may be enciphered to protect the data within that archive from malicious manipulation or for other security purposes by controlling access through use of the password. The cipher module 107 can also manage and maintain password protection for the archives. Password management can include clearing a user for a password when accessing a persistent storage device and providing an interface for a user to change a password for an archive.

Other components can be linked to the computer system 101 over a network 115. The network 115 can be any type of network including a local area network (LAN), a wide area network (WAN), such as the Internet or similar networks. The network can have wired or wireless components. Any number of devices may be in communication with one another over the network 115. In one embodiment, the archive management module 105 enables the computer 101 and applications 103 on the computer 101 to interface with archives on other devices such as a remote storage unit 117 or another computer 151. The archive management module 105 can access these other storage archives directly or through intermediate programs or protocols. For example, the archive management module 105 can interface with another archive management module 155 to access archives local to that archive management module 155.

A remote storage device 117 can be a network server or storage device such as an external hard drive connected over a USB network or a remote backup device or similar storage device. The remote storage device 117 can store any number of archives 113C and provide access to these archives to any number of archive management modules 105, 155.

The computer 151 can be any type of computer including a desktop computer, server, laptop computer, handheld device, wireless device, console device or similar computing device. The computer 151 can include each of the elements described above in regard to computer 101. These components can include applications 133, archive management module 135, cipher module 137, fixed storage devices 159, removable storage device 155 and similar components.

Any number of archives 113A-F can be stored on any of the available storage devices. Any number of separate archives can be stored on any single device. Likewise, individual archives can be distributed across any number of these devices. The archives can have any format or size.

Figure 2A:
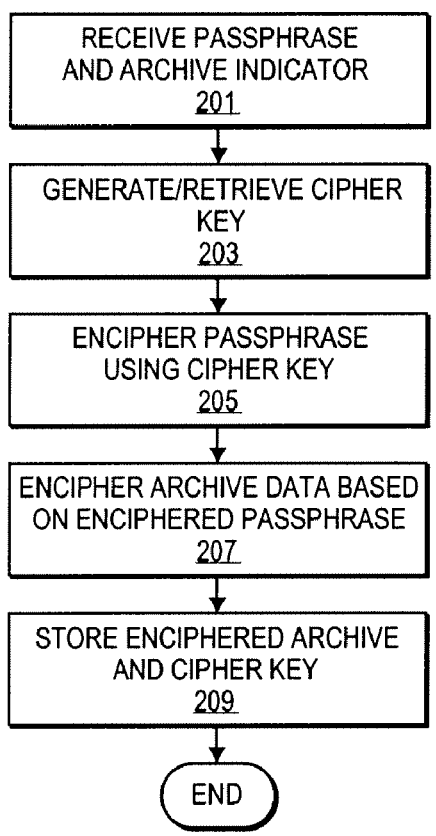
FIG. 2A is a flowchart of one embodiment of a process for enciphering an archive.

FIG. 2A is a flowchart of one embodiment of a process for enciphering an archive. This process utilizes a passphrase to encipher an archive key. The archive key, in its unenciphered state, is used to encipher data to be stored in an archive. Each archive enciphered using this process will have a separate archive key even if the same passphrase is utilized. This process is executed by any combination of the archive management module and the cipher module.

The process can be initiated in response to receiving a passphrase and an archive indicator from a user or an application (block 201). A passphrase can be any value including alphanumeric values, symbols, spaces, control codes or similar values and have any format or any size. Restrictions can be placed on the value and size of the passphrase. The characteristics of the passphrase can be defined by a user, system administrator or programmer. An archive indicator can be an explicit indicator or an inherent indicator. An explicit indicator provides a file name or similar address for the archive to be accessed or created. An inherent indicator would be an address or file and path name determined based on inference such as the activation of the archive management module in a particular context or a fixed relationship between an archive management module and an archive that has been established in a configuration file, programming or similar manner. Other parameters can also be received with the passphrase and archive indicator including configuration information for the process such as selection of ciphering algorithms to be utilized in the process, location information for data to be enciphered or similar information.

In response to receiving the passphrase and archive indicator, the process either generates or retrieves a cipher key. The cipher key can be any randomly generated string of binary values that is then associated with the archive to be accessed or created (block 203). A cipher key would be created if the archive indicator does not correspond to or identify an existing archive. If the archive indicator does correspond to an existing archive then the cipher key for that archive would be retrieved. In either case, the retrieved or generated cipher key is used to encipher the passphrase using a ciphering algorithm such as a hashing algorithm or message authentication code (MAC) algorithm (block 205). The cipher key can be retrieved from the archive and utilized because it is not enciphered; rather, it is stored in the clear. However, without the appropriate passphrase to encipher using the cipher key, the archive data cannot be accessed or properly enciphered.

The archive data can then be enciphered using a block cipher (e.g., the data encryption standard (DES) algorithm or similar block cipher algorithms), a streaming cipher algorithm (e.g., RC4 or similar streaming cipher algorithms) or similar cipher algorithm (block 207). The enciphering algorithm utilizes the enciphered passphrase as its key. Any amount or size of data can be enciphered using the enciphering algorithm and the enciphered passphrase as a key. A single block or streaming cipher algorithm or multiple deciphering algorithms can be utilized with the enciphered passphrase as a key to encipher data to be archived. The received or indicated data is stored as part of the indicated archive after enciphering and if the cipher key is newly generated, the cipher key will also be stored with the archive (block 209). The archive can have any structure, format or any amount of metadata associated with it including the cipher key and similar data. The cipher key can be stored at a known location in the archive for later retrieval or at a location that can be derived from information known to the deciphering process.

Figure 2B:
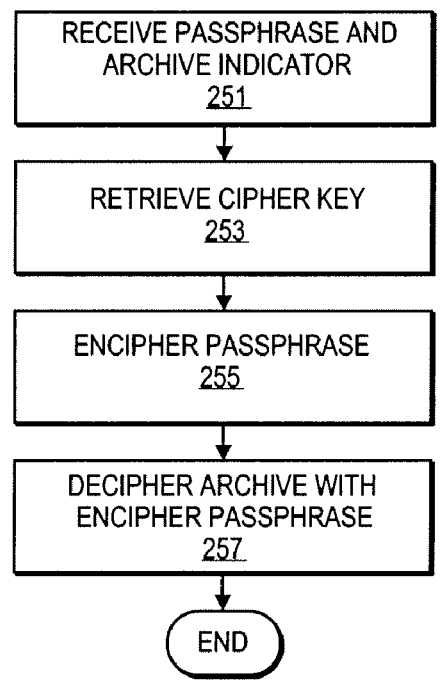
FIG. 2B is a flowchart of one embodiment of a process for deciphering an archive.

FIG. 2B is a flowchart of one embodiment of a process for deciphering an archive. The deciphering process is initiated in response to receiving a passphrase and an archive indicator from the user (block 251). A passphrase can be any value including alphanumeric values, symbols, spaces, control codes or similar values and have any format or any size. For the deciphering process to produce accurately deciphered data, the received passphrase must be identical to the original passphrase utilized to encipher the archive data. The archive indicator can include a location or address of an archive from which data is to be retrieved. In other embodiments, additional parameters are received that specify a location for the deciphered information to be placed, a selection of a block or streaming cipher algorithm or similar configuration information relevant to the deciphering process.

In response to receiving the passphrase, the cipher key for the indicated archive is retrieved (block 253). The cipher key is retrieved from a location that is known or derivable based on known information. The cipher key is then used as a key to a ciphering algorithm such as a hashing algorithm or MAC algorithm (block 255). The hashing or MAC algorithm that is utilized is identical to or a mirror of the algorithm that is used for the enciphering of the passphrase in the enciphering process described above in regard to FIG. 2A. After generating the enciphered passphrase, the enciphered passphrase can be used as a key with a block or streaming deciphering algorithm or similar algorithm to decipher the indicated data in the archive (block 257). The block or streaming deciphering algorithm can be the identical or the mirror of the block or streaming cipher algorithm used to encipher the data originally.

Figure 5:
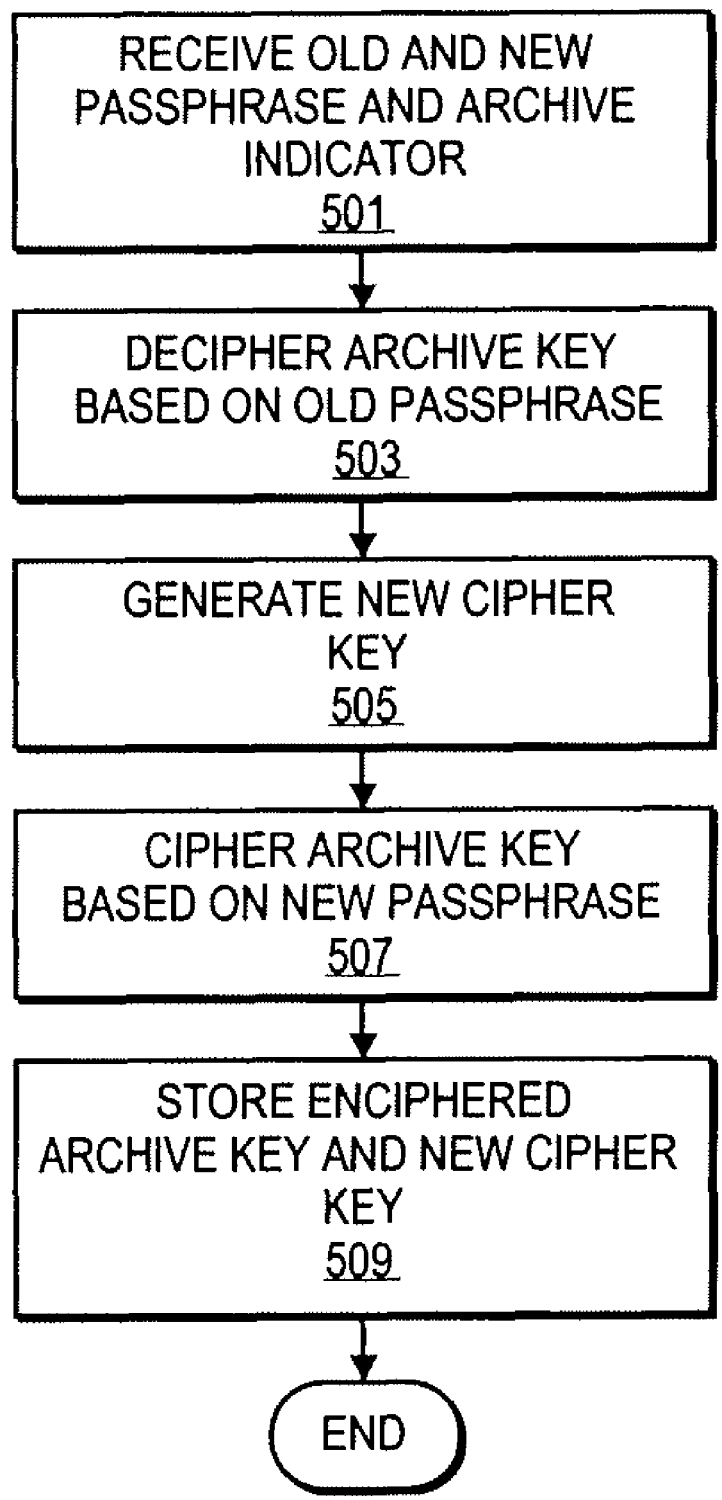
FIG. 5 is a diagram of one embodiment of a process for replacing a passphrase for an archive.

The processes of FIGS. 2A and 2B enable the management of archives where a single passphrase can be used to encipher multiple archives but with separate keys being utilized to encipher the archive data. Using different keys for each archive makes the respective archives more secure by decreasing the set of available data to maliciously decrypt. However, these processes leave a problem of having to re-encipher the entirety of each of the archives if it is needed to change the passphrase, because the key for each of the archives is based on the passphrase itself. FIGS. 3, 4 and 5 below describe an alternative embodiment that provides both a separate key for each archive and also a system for allowing the archive passwords to be changed without having to re-encipher each of the archives.

FIG. 3 is a flowchart of one embodiment of a process for enciphering an archive or data to be stored in an archive. The process is initiated in response to receiving an archive indicator and a passphrase (block 301). The passphrase and archive indicator can be received from a calling application or from a user. The archive indicator can indicate the location of an archive in which data is to be stored. Other parameters can be received that specify configuration related to the enciphering process such as the location of data to be enciphered or the ciphering algorithms to be utilized in the process. In another embodiment, any of these parameters may be inherent or pre-defined. A passphrase can be any value including alphanumeric values, symbols, spaces, control codes or similar values and have any format or any size.

In response to receiving the passphrase and the archive indicator, the process retrieves or generates a cipher key and an archive key (block 303). Each of these values is a randomly generated number. Any pseudo-random number generator can be used to generate these values and any size or format of a string of random binary values can be utilized as a cipher key and an archive key. These values are retrieved from an archive if it is an existing archive and are generated if data is to be stored in a new archive.

The cipher key is utilized to encipher the passphrase (block 305). Any cipher algorithm can be used to encipher the passphrase including a hashing algorithm or MAC algorithm. The enciphered passphrase is then used to encipher the archive key (block 307). The archive key can be enciphered with any reversible enciphering algorithm or operation including block or streaming ciphering algorithms, XOR based operations and similar enciphering methods. Use of a cipher key and an archive key that are separate from the passphrase in their generation allows the passphrase to be changed easily. A change of the passphrase requires only that the archive keys be re-ciphered. This provides a large time and resource savings, because the archives themselves do not have to be re-ciphered.

The data to be archived is enciphered with the archive key (block 309). Any block or streaming cipher algorithm or similar algorithm can be utilized to encipher the data to be archived. The archive keys in their unenciphered state are utilized as keys in the ciphering algorithms. A single ciphering algorithm or a set of ciphering algorithms can be utilized to encipher the data. One skilled in the art would understand that the enciphering of the data to be archived can be performed at any point after the generation of the archive keys. The example embodiment presents a serial or linear process, however, the enciphering of the data to be archived as well as other aspects of the process can also be performed partially or wholly in parallel with one another. For sake of clarity, the serial embodiment has been described herein.

The cipher key, enciphered data and enciphered archive key are then stored in an existing archive (Block 311). The cipher key is stored in the clear. The cipher key and enciphered key are stored in known locations or in locations that can be derived from known information. The archive can have any format or structure.

FIG. 4 is a diagram of one embodiment of a process for deciphering an archive. This process is initiated in response to receiving a passphrase and an archive indicator (block 401). A passphrase can be any value including alphanumeric values, symbols, spaces, control codes or similar values and have any format or any size. The archive indicator can specify an archive or section of an archive from which data is to be retrieved. An additional set of parameters can be received that indicate a subsection of an archive to be deciphered. The additional parameter information can also include a location or address information for the location at which the deciphered data is to be sent or stored or a selection of a deciphering algorithm. Other similar parameters specifying configuration information can also be received.

After the passphrase and archive indicator are received, the cipher key for the designated archive is extracted (block 403). The cipher key is stored in a known location or a location that is derived from known information. The passphrase is then enciphered using the cipher key (block 405). Any enciphering algorithm such as a hashing algorithm or MAC algorithm can be utilized to encipher the passphrase using the cipher key. The hashing or MAC algorithm is identical to or a mirror of the ciphering algorithm utilized to encipher the passphrase during the enciphering process.

The enciphered archive key is then retrieved from the designated archive (block 407). The enciphered archive key is stored at a known location or at a location that is derived from known information. The archive key is then deciphered (block 409). The archive key is deciphered using the enciphered passphrase as a key to the deciphering algorithm. The deciphering algorithm is a mirror of the algorithm utilized to encipher the archive key such as a block or streaming cipher algorithm, an XOR based operation or similar decipherable method.

The archive or subsection of the archive indicated by the archive indicator is then deciphered (block 411). Any block or streaming deciphering algorithm can be utilized. The deciphering algorithm is a mirror or inversion of the enciphering algorithm utilized in the enciphering of the archive data. The deciphered information is then returned to the application that called the process or the stored in location passed in as parameter to the process.

FIG. 5 is a diagram of one embodiment of a process for replacing a passphrase for an archive. This process can be initiated by receiving an old and new passphrase as well as an archive indicator (block 501). The old and new passphrase can be received from an application or through a prompt provided by the archive management module. The old and new passphrases can be any values including alphanumeric values, symbols, spaces, control codes or similar values and have any format or any size. A check may be made to verify the old passphrase as accurate and/or not identical to the new passphrase. Other checks may be made to ensure that the new passphrase has met certain security requirements such as length and variance in the content of the new passphrase. The archive indicator may provide a location or an address of an archive to be accessed for the change in passphrase, which requires retrieval of the enciphered archive key for that archive.

The archive key is retrieved from the designated archive and the archive key is deciphered using the old passphrase (block 503). A mirror or equivalent of the block or streaming cipher algorithm, XOR operation or similar ciphering method is utilized to decipher the archive key. A new cipher key for the archive may then be generated (block 505). The old cipher key could be utilized, however, generating a new cipher key increases the security of the process.

The archive key is then enciphered based on the new passphrase (block 507). Any block cipher, streaming cipher, XOR based operation or similar reverisible ciphering method can be utilized to encipher the archive key based on the new passphrase. The same algorithm may be used as was previously used or the algorithm may be changed on each change of the passphrase. The newly enciphered archive key is then stored again in the archive (block 509). If a new cipher key is generated, the cipher key is stored in the archive, replacing the old cipher key. The location of the archive key and the new cipher key may remain the same or may be changed according to an algorithm that varies the location of these data points in the archive.

Figure 6:
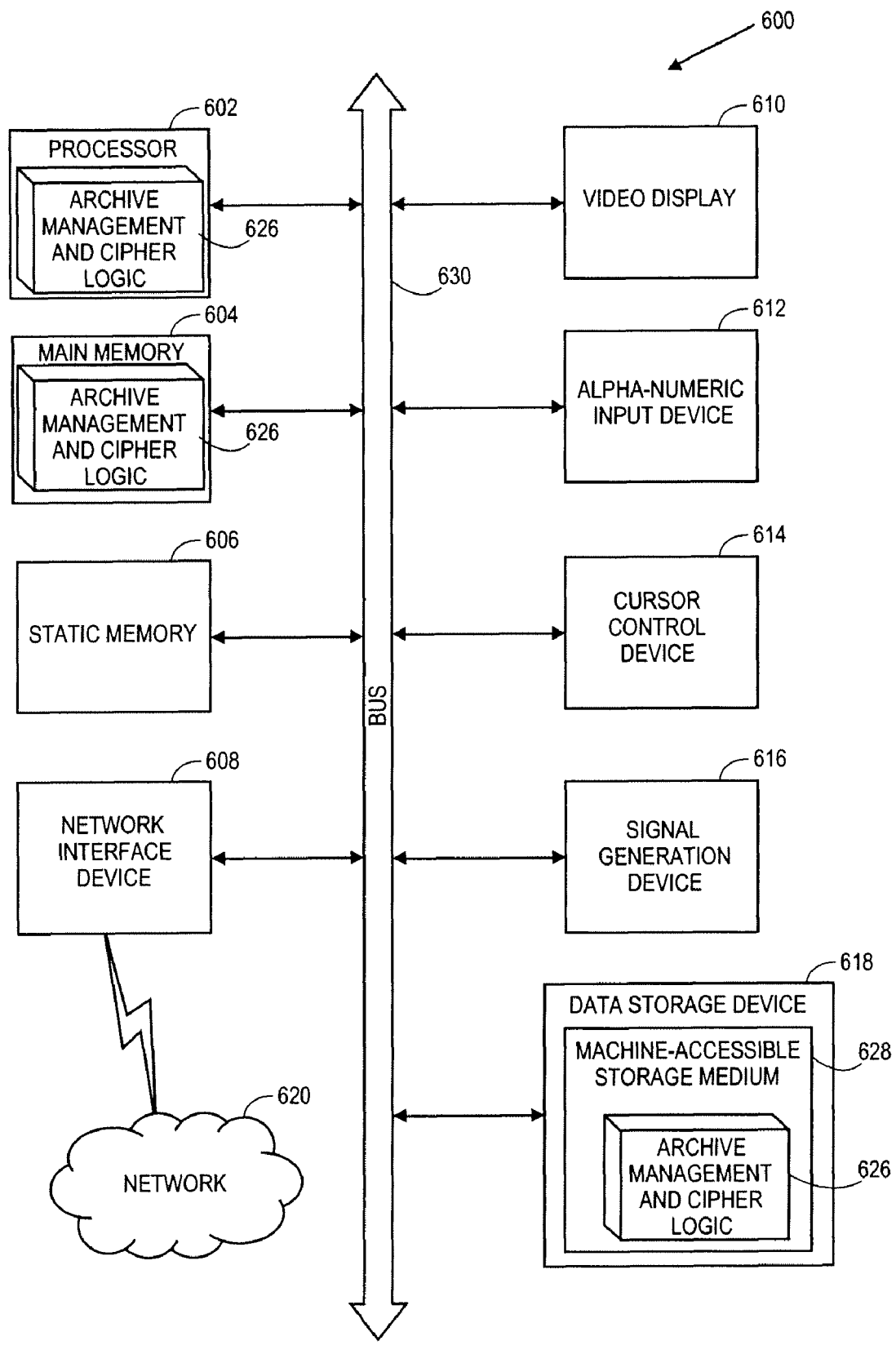
FIG. 6 is a diagram of one embodiment of a system to execute the archive management process.

FIG. 6 is a diagram of one embodiment of a system to execute the archive management process. The figure illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, a WAN, an intranet, an extranet, or the Internet. The machine may operate in the capacity of a server or a client machine (e.g., the computer executing archive management module in a distributed archiving scheme) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable medium), which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the archive management module and cipher module logic 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., archive management and cipher logic 626) embodying any one or more of the methodologies or functions described herein. The logic 626 may also reside, completely or at least partially, within the main memory 604 and/or within the processing device 602 during execution thereof by the computer system 600, the main memory 604 and the processing device 602 also constituting machine-readable storage media. The logic 626 may further be transmitted or received over a network 618 via the network interface device 622.

The machine-readable storage medium 624 may also be used to store the archive management logic and cipher logic 626 persistently. While the machine-readable storage medium 624 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "searching," "receiving," "updating," "modifying," "assigning," "requesting," "clearing," "running," "committing," "moving," "executing," "closing," "detecting," "initiating," "returning," "retrieving," "encrypting," "truncating," "replacing," "calculating," "recalculating," "comparing, " "validating," "authenticating," "obtaining," "enciphering," "deciphering," "recalculating" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for archive management has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
    receiving a passphrase;
    obtaining a cipher key and an archive key;
    enciphering the passphrase using the cipher key to generate an enciphered passphrase;
    enciphering an archive with the archive key;
    enciphering the archive key using the enciphered passphrase;
    receiving a replacement passphrase;
    generating a new cipher key for the archive;
    enciphering the replacement passphrase using the new cipher key to generate an enciphered replacement passphrase; and
    enciphering the archive key using the enciphered replacement passphrase, without re-enciphering the archive.

2. The computer-implemented method of claim 1, further comprising:
    generating the cipher key as a random number unique to the archive.

3. The method of claim 1, further comprising:
    generating the archive key as a random number unique to the archive.

4. The computer-implemented method of claim 1, further comprising:
    deciphering the enciphered archive key using the passphrase.

5. The method of claim 1, further comprising:
    storing an enciphered archive comprising a cipher key and enciphered archive key.

6. The method of claim 5, wherein the cipher key and enciphered archive key are stored in known locations within the enciphered archive.

7. The method of claim 1, further comprising:
    retrieving the cipher key;
    recalculating the enciphered passphrase; and
    deciphering the archive key using the enciphered passphrase.

8. A non-transitory computer readable storage medium, having instructions stored therein, which when executed, cause a computer to perform a set of operations comprising:
    receiving a passphrase;
    obtaining a cipher key and an archive key;
    enciphering the passphrase using the cipher key to generate an enciphered passphrase;
    enciphering an archive with the archive key;
    enciphering, by the computing device, the archive key using the enciphered passphrase;
    receiving, by the computing device, a replacement passphrase;
    generating, by the computing device, a new cipher key for the archive;
    enciphering, by the computing device, the replacement passphrase using the new cipher key to generate an enciphered replacement passphrase; and
    enciphering, by the computing device, the archive key using the enciphered replacement passphrase, without re-enciphering the archive.

9. The non-transitory computer readable storage medium of claim 8, having further instructions therein, which when executed, cause the computer to perform a further set of operations, further comprising:
    generating the cipher key as a random number unique to the archive.

10. The non-transitory computer readable storage medium of claim 8, having further instructions therein, which when executed, cause the computer to perform a further set of operations, further comprising:
    generating the archive key as a random number unique to the archive.

11. The non-transitory computer readable storage medium of claim 8, having further instructions therein, which when executed, cause the computer to perform a further set of operations, further comprising deciphering the enciphered archive key using the passphrase.

12. The non-transitory computer readable storage medium of claim 8, having further instructions stored therein, which when executed perform a set of operations, further comprising:
    storing an enciphered archive comprising a cipher key and enciphered archive key.

13. The non-transitory computer readable storage medium of claim 12, wherein the cipher key and enciphered archive key are stored in known locations within the enciphered archive.

* * * * *